US006508454B1

(12) United States Patent
Vanderveen et al.

(10) Patent No.: US 6,508,454 B1
(45) Date of Patent: Jan. 21, 2003

(54) SNAP-FIT THROTTLE SHAFT

(75) Inventors: James K. Vanderveen, Blenheim (CA); Paul D. Daly, Troy, MI (US); Zhouxuan Xia, Windsor (CA)

(73) Assignee: Siemens Canada Limited, Tilbury (CA)

( * ) Notice: Subject to any disclaimer, the term of this patent is extended or adjusted under 35 U.S.C. 154(b) by 0 days.

(21) Appl. No.: 09/655,688

(22) Filed: Sep. 6, 2000

Related U.S. Application Data

(60) Provisional application No. 60/152,795, filed on Sep. 8, 1999.

(51) Int. Cl.[7] .......................... F16K 31/44; F16K 1/22; F16C 29/00; F02D 9/08

(52) U.S. Cl. ......................... 251/214; 251/305; 384/28; 123/337

(58) Field of Search ................................ 251/214, 305; 384/28; 123/337

(56) References Cited

U.S. PATENT DOCUMENTS 3,338,549 A * 8/1967 Anthes
3,381,935 A * 5/1968 Middler
4,625,943 A * 12/1986 Groger ....................... 251/305
4,789,000 A * 12/1988 Aslanian ..................... 137/556
4,880,207 A * 11/1989 Matsumoto et al. ......... 251/337
5,035,214 A 7/1991 Daly et al.
5,098,064 A 3/1992 Daly
5,170,985 A * 12/1992 Killworth et al. ........... 248/635
5,178,433 A * 1/1993 Wgner ....................... 296/35.1
5,513,674 A * 5/1996 Frisch .................. 137/625.69
5,522,361 A * 6/1996 Pickman et al. ............ 123/336
5,687,691 A * 11/1997 Kaiser et al. ............... 123/337
5,797,589 A 8/1998 Kalebjian et al.
5,984,269 A * 11/1999 Short, III et al. ........... 251/305

FOREIGN PATENT DOCUMENTS

GB 2 067 719 A 12/1980

OTHER PUBLICATIONS

European Search Report completed by Jul. 16, 2001.

* cited by examiner

*Primary Examiner*—Philippe Derakshani
*Assistant Examiner*—David A Bonderer

(57) ABSTRACT

A method and apparatus is provided for snap-fit attachment of a throttle shaft to a throttle body. A pair of resilient cantilevered tangs is formed on a distal end of the throttle shaft. Bearings are installed within a bore formed in the throttle body to rotatably support the shaft. The shaft is inserted through an opening in the bearings to compress the tangs and the tangs are resiliently returned to an extended position to prevent withdrawal of the shaft from the throttle body.

19 Claims, 2 Drawing Sheets

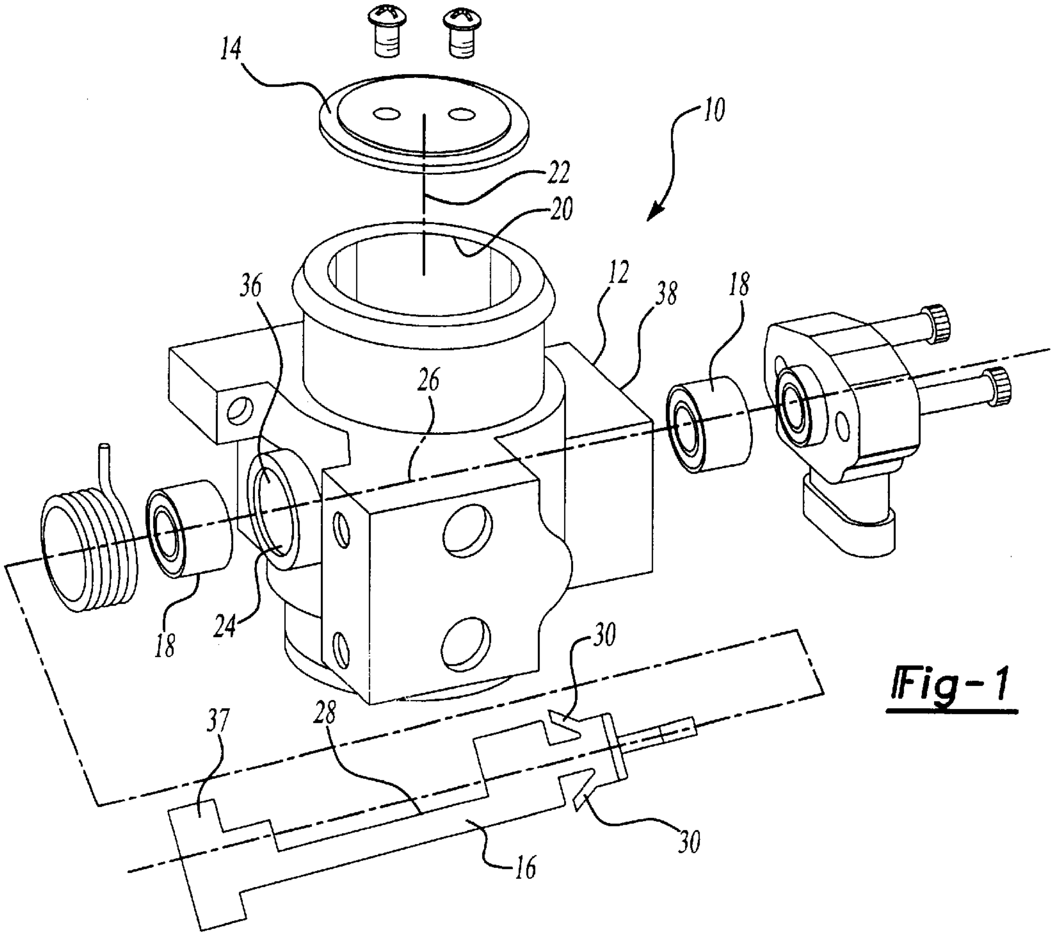
Fig-1
Fig-3
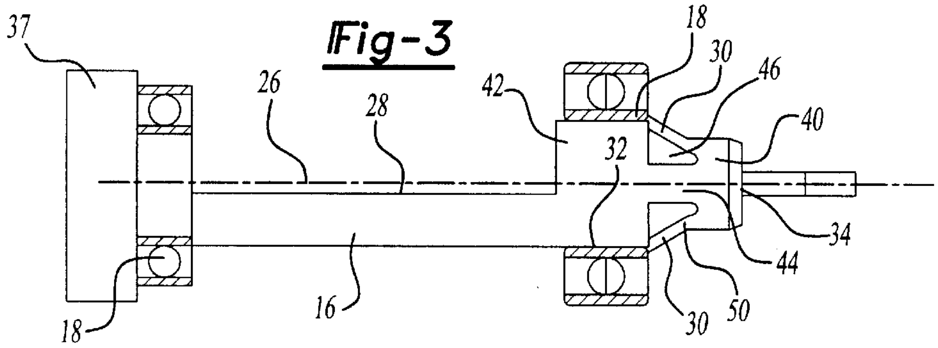
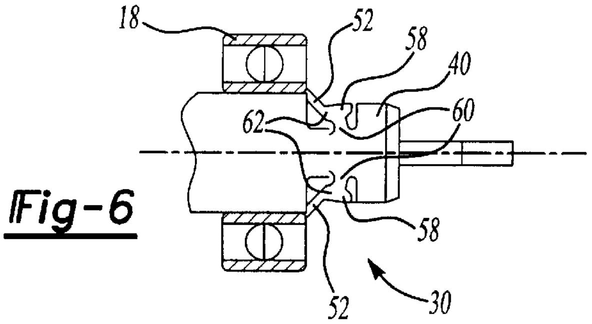
Fig-6

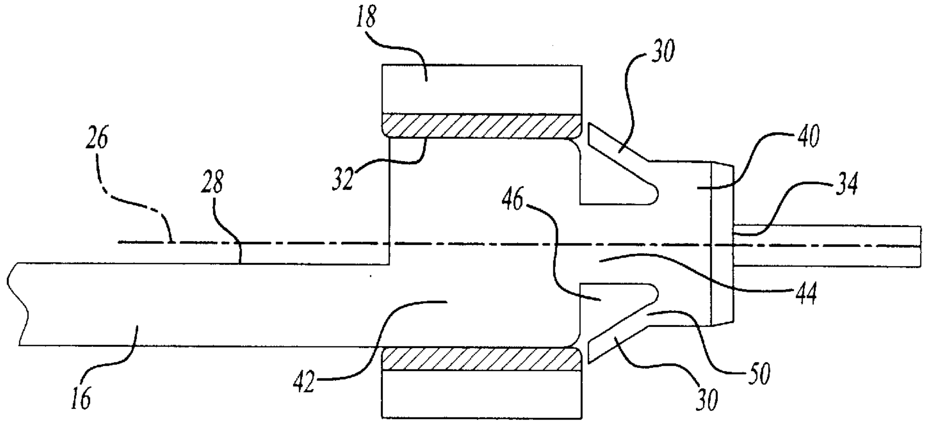
Fig-2
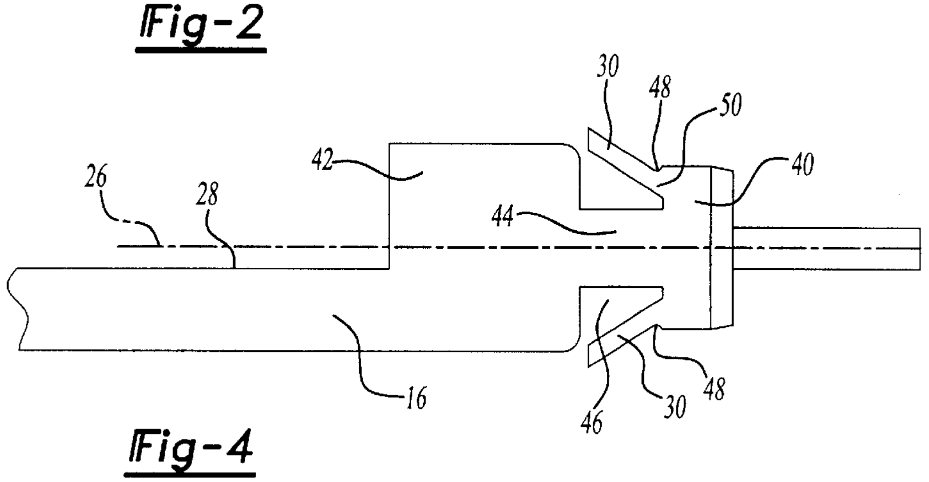
Fig-4
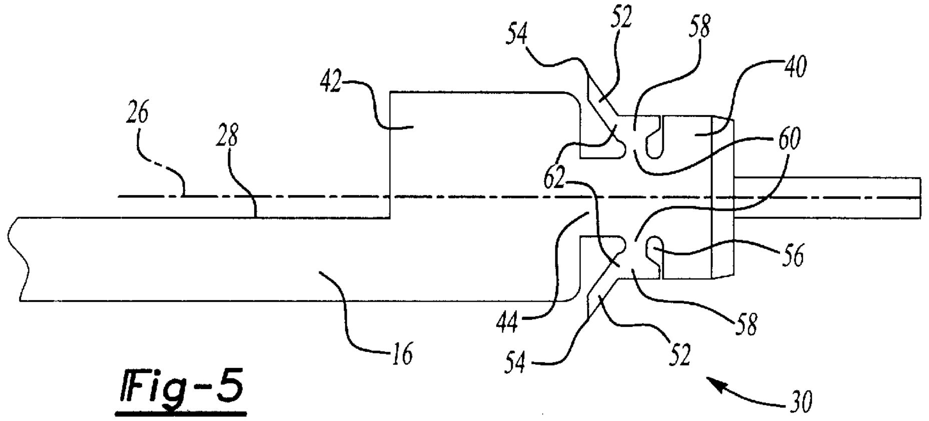
Fig-5
Fig-7
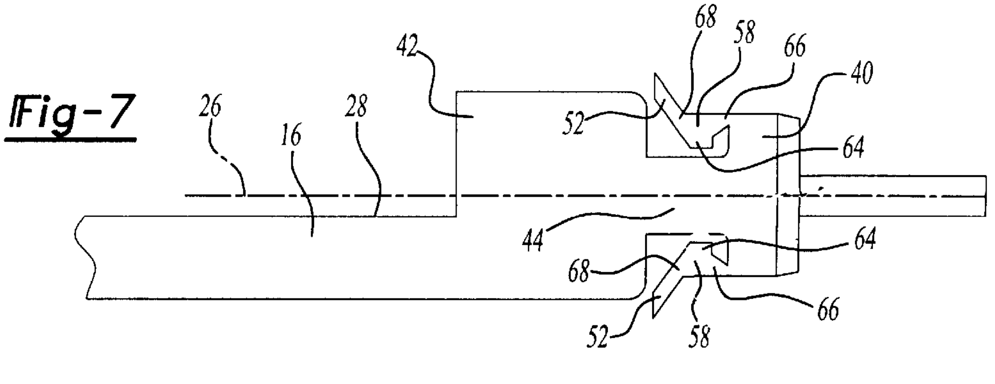

SNAP-FIT THROTTLE SHAFT

RELATED APPLICATION

This application claims priority to provisional application 60/152,795 filed on Sep. 8, 1999.

BACKGROUND OF THE INVENTION

1. Field of the Invention

This invention relates to a method and apparatus for attaching a throttle shaft to a throttle body.

2. Related Art

Throttle valves typically include a throttle blade or disc attached to a throttle shaft, which extends across a bore formed in a throttle body. The throttle blade rotates within the bore to control air flow from an intake manifold to a vehicle engine. A pair of bearings is supported within the bore to facilitate rotation of the throttle shaft.

The assembly of the throttle shaft into the throttle body is a time consuming and labor intensive process. The bearings are installed within the bore of the throttle body and the shaft is inserted into the bore and through the bearings. To properly align the throttle disc within the bore, the shaft must be properly located with respect to the bearings and the throttle body. Typically, a distal end of the throttle shaft has a groove formed about the circumference of the shaft. Once the shaft has been inserted through the bearings, a snap ring is fitted into the groove to secure the shaft in place.

One disadvantage with this assembly process is that multiple operations are needed, which require two free hands from the assembler. This increases assembly time and cost. Thus, it is desirable to. provide a shaft attachment method and apparatus that decreases assembly time and cost, and which eliminates components resulting in improved quality characteristics.

SUMMARY OF THE INVENTION

The subject invention provides a simplified snap-fit attachment of a throttle shaft to a throttle body. The snap-fit attachment eliminates components and reduces assembly time and cost.

In a disclosed embodiment of this invention, a throttle assembly includes a throttle body having an airflow passage defining a longitudinal axis. A bore is formed within the throttle body that intersects the airflow passage and defines an axis of rotation that is transverse to the longitudinal axis. At least one bearing is supported by the throttle body within the bore and a throttle shaft is supported by the bearing. The shaft has at least one resilient cantilevered tang that retains the throttle shaft within the throttle body.

Preferably, the tang is compressed as the shaft is inserted through a central opening in the bearing. The tang is resiliently returned to a non-compressed position after the tang clears the bearing to prevent withdrawal of the shaft from the bearing.

The method of assembling the throttle shaft to the throttle body includes the following steps. At least one resilient cantilevered tang is formed on a distal end of the throttle shaft. At least one bearing is installed within a bore formed in the throttle body. The shaft is inserted through an opening in the bearing to compress the tang and the tang is resiliently returned to an extended position to prevent withdrawal of the shaft from the throttle body. Preferably, an injection molding process is used to integrally form the shaft and tang as one piece.

These and other features of the present invention can be best understood from the following specification and drawings, the following of which is a brief description.

BRIEF DESCRIPTION OF THE DRAWINGS

FIG. 1 is an exploded perspective view of a throttle assembly including the subject invention.

FIG. 2 is a side cross-sectional view, partially cut-away, of one assembled embodiment of the subject throttle shaft and bearing assembly.

FIG. 3 is a side cross-sectional view, partially cut-away, of the shaft and bearing of FIG. 2 during assembly.

FIG. 4 is a side cross-sectional view, partially cut-away, of an alternate embodiment of a throttle shaft and bearing assembly.

FIG. 5 is a side cross-sectional view, partially cut-away, of an alternate embodiment of a throttle shaft and bearing assembly.

FIG. 6 is a side cross-sectional view, partially cut-away, of the shaft and bearing of FIG. 5 during assembly.

FIG. 7 is a side cross-sectional view, partially cut-away, of an alternate embodiment of a throttle shaft and bearing assembly.

DETAILED DESCRIPTION OF AN EXEMPLARY EMBODIMENT

A throttle assembly 10, shown in FIG. 1, includes a throttle body 12, a throttle disc or blade 14, a throttle shaft 16, and a pair of bearing assemblies 18. Throttle body 12 has an airflow passage 20 that defines a longitudinal axis 22. The throttle disc 14 rotates within the passage 20 to control air flow from an intake manifold to a vehicle engine (not shown).

The body 12 also includes a transversely extending bore 24 that intersects the airflow passage 20. The bore 24 defines an axis of rotation 26 that is transverse to the longitudinal axis 22. The bearing assemblies 18 fit into opposite ends of the bore 24. When assembled, the shaft 16 is journaled on the throttle body 12 via the bearings 18 such that a notch 28 on the shaft 16 is positioned within the passage 20. The disc 14 is mounted on the shaft 16 at the notch 28 by means well known in the art. The disc 14 is mounted for rotation with the throttle shaft 16 about the axis of rotation 26 and is positioned within the throttle body 12 at an intersection between the passage 20 and the bore 24 to control airflow through the passage 20.

As shown more clearly in FIG. 2, the throttle shaft 16 includes a pair of resilient cantilevered arms or tangs 30 that retain the throttle shaft 16 within the throttle body 12 after assembly. The tangs are flexed or compressed as the shaft 16 is inserted through a central opening 32 in the bearing 18. The tangs resiliently return to a non-compressed position after the tangs 30 clear the bearing 18 to prevent withdrawal of the shaft 16 from the bearing 18. While a pair of tangs 30 are shown it should be understood that a single tang 30 or a plurality of tangs 30 could also be used to retain the shaft 16 within the body 12.

The tangs 30 extend radially out from the shaft 16 in a direction transverse to the axis of rotation 26. Preferably the angle formed between the tang 30 and the shaft is less than ninety degrees. The tangs 30 are formed at a distal end 34 of the shaft 16 adjacent to the notch 28. As shown in FIG. 3, the tangs 30 are compressed when inserted through the first bearing 18 positioned on one side 36 of the bore 24 and are again compressed when inserted through the second bearing 18 on the opposite side 38 of the bore 24 to complete the assembly. Once assembled, the shaft 16 cannot be removed from the bearings 18 in a reverse insertion direction until the tangs 30 are either manually compressed or compressed with a tool (not shown).

A shoulder portion 36 (see FIGS. 1 and 3) prevents the shaft 16 from moving too far in the insertion direction. When assembled, the shoulder portion 37 preferably abuts against the face of the housing 12 at the opening 36. The shoulder 37 and tangs 30 cooperate to keep the shaft in position in the housing 12.

The tangs 30 extend outwardly from a head portion 40 formed at the distal end 34 of the shaft. A shaft body portion 42 between the notch 28 and the head portion 40 is supported in the bearing 18. The shaft 16 includes a neck 44 having a smaller diameter than both the body portion 42 and the head portion 40 that forms the transition between the body 42 and head 40 portions. The tangs 30 extend radially outwardly from the head 42 such that a clearance gap is 46 formed between the tang 30 and the neck 44. This provides clearance for the tangs 30 to compress as the tangs 30 are inserted through the bearings 18.

An alternate embodiment is shown in FIG. 4. The tangs 30 each include a notch 48 formed between the tang 30 and the head 40. The notches 48 allow greater flexibility for the tangs 30 as the tangs 30 are inserted through the bearings. In the embodiments shown in FIGS. 2–4, the tangs 30 have a single bending point 50 about which the tangs 30 flex.

In an alternate embodiment, shown in FIG. 5, there are multiple bending points for the tangs 30. In this embodiment, the tang 30 includes a transversely extending member 52 formed at a distal end 54 of the tang 30. A notch or groove 56 is formed about the shaft 16 between the head 40 and the tang 30. The tang includes a main portion 58 that is generally parallel to the axis of rotation 26 and the transversely extending member 52 extends out radially from the main portion 58.

The tang 30 includes a first bending portion 60 located between the main portion 58 and the shaft 16 and a second bending portion 62 located between the main portion 58 and the transversely extending member 52, shown in FIG. 6. The tangs 30 flex about these bending points 60, 62 as the shaft 16 is inserted through the bearings 18. Having multiple bending points more evenly distributes the bend load along the tang 30 and decreases the likelihood of breaking the tangs 30 during assembly.

In another embodiment, the tang 30 includes a stop 64 that engages the neck 44 to defining a maximum bend position for the tang 30 as the shaft 16 is inserted through the bearing 18. The tang 30 includes a first bending portion 66 located between the main portion 58 and the head 40 and a second bending portion 68 located between the main portion 58 and the transversely extending member 52. The tangs 30 flex about these bending points 66, 68 as the shaft 16 is inserted through the bearings 18.

Preferably, the tangs 30 are integrally formed with the shaft 16 as one piece. While the shaft 16 can be made from various different types of material known in the art, the shaft 16 is preferably made from plastic. An injection molding process is used to form the shaft 16 and the tangs 30. To provide a more robust component, the tangs are formed in the line of draw for the split lines of the moldings used during the injection molding process.

The method of assembling the throttle shaft 16 to the throttle body 12 includes the following steps. At least one resilient cantilevered tang 30 is formed on the distal end 34 of the throttle shaft 16. Bearings 18 are installed in the bore 24 formed in the throttle body 12. The shaft 16 is inserted through an opening in the bearing 18 to compress the tang 30. The tang 30 resiliently returns to an extended position to prevent withdrawal of the shaft 16 from the throttle body 12.

The subject invention provides a simplified snap-fit attachment of a throttle shaft 16 to a throttle body 12. The snap-fit attachment eliminates components and reduces assembly time and cost. Although a preferred embodiment of this invention has been disclosed, it should be understood that a worker of ordinary skill in the art would recognize many modifications come within the scope of this invention. For that reason, the following claims should be studied to determine the true scope and content of this invention.

What is claimed is:

1. A throttle assembly comprising:

a throttle body having an airflow passage defining a longitudinal axis and a bore intersecting said airflow passage and defining an axis of rotation that is transverse to said longitudinal axis;

at least one bearing supported by said throttle body within said bore; and a throttle shaft supported by said bearing and having at least one resilient cantilevered tang for retaining said throttle shaft within said throttle body.

2. An assembly according to claim 1 wherein said tang is compressed as said shaft is inserted through a central opening in said bearing, said tang resiliently returning to a non-compressed position after said tang clears said bearing to prevent withdrawal of said shaft from said bearing.

3. An assembly according to claim 2 wherein said tang extends radially out from said shaft in a direction transverse to said axis of rotation.

4. An assembly according to claim 3 wherein said tang is formed in a distal end of said shaft.

5. An assembly according to claim 4 including a notch formed between said tang and said shaft.

6. An assembly according to claim 4 wherein said tang includes a transversely extending member formed at a distal end of said tang and wherein said tang includes a first bending portion located between said shaft and said tang and a second bending portion located between said tang and said transversely extending member.

7. An assembly according to claim 4 wherein said tang includes a stop member that engages said shaft to define a maximum bend position as said shaft is inserted through said bearing.

8. An assembly according to claim 2 wherein said tang is integrally formed with said shaft as one piece.

9. An assembly according to claim 8 wherein said shaft is formed from plastic via injection molding.

10. An assembly according to claim 1 wherein said throttle shaft is rotatably supported on said bearing for rotation about said axis of rotation and wherein said tang prevents linear movement of said shaft within said bore in a direction opposite from an insertion direction.

11. A method of assembling a throttle shaft to a throttle body comprising the steps of:

(a) forming at least one resilient cantilevered tang on a distal end of the throttle shaft;

(b) installing at least one bearing in a bore formed in the throttle body;

(c) inserting the shaft through an opening in the bearing to compress the tang; and (d) resiliently returning the tang to an extended position to prevent withdrawal of the shaft from the throttle body.

12. The method according to claim 11 including the step of integrally forming the tang and the shaft as one piece.

13. The method according to claims 12 including the step of forming the shaft from injection molded plastic.

14. The method according to claim 11 including the step of forming a notch between the tang and the shaft to provide a clearance gap as the shaft is inserted through the bearing.

15. The method according to claim 11 wherein step (d) further includes preventing linear movement of the shaft within the throttle body once the tang has been returned to the extended position.

16. A throttle assembly comprising:

a throttle body having an airflow passage defining a longitudinal axis and a bore intersecting said airflow passage and defining an axis of rotation that is transverse to said longitudinal axis;

a first bearing supported by said throttle body at one end of said bore and a second bearing supported by said throttle body at an opposite end of said bore;

a throttle shaft supported by said bearings and having a plurality of resilient cantilevered tangs formed at. one end for retaining said throttle shaft within said throttle body; and a throttle disc mounted for rotation with said throttle shaft about said axis of rotation and positioned within said throttle body at an intersection between said passage and said bore to control airflow through said passage.

17. An assembly according to claim 16 wherein said tangs are compressed as said shaft is inserted through said bearings and resiliently returned to a non--compressed position after said tangs clear said bearings to prevent withdrawal of said shaft from said bearings.

18. An assembly according to claim 17 wherein said plurality of resilient cantilevered tangs is comprised of a pair of resilient cantilevered tangs positioned on opposing sides of said shaft.

19. An assembly according to claim 16 wherein said tang is movable between a compressed position and an extended position, said tang being in said compressed position during installation of said shaft within said bearings along an insertion path and being in said extended position after installation of said shaft within said bearings such that said shaft is prevented from linear movement in an opposite direction from said insertion path.

* * * * *